(12) United States Patent
Kaneta et al.

(10) Patent No.: US 8,017,260 B2
(45) Date of Patent: Sep. 13, 2011

(54) SECONDARY BATTERY HAVING THIRD TERMINAL OTHER THAN POSITIVE AND NEGATIVE ELECTRODE TERMINALS AND BATTERY COMPRISING IT

(75) Inventors: Hiroshi Kaneta, Tokyo (JP); Chika Kanbe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/505,417

(22) PCT Filed: Apr. 23, 2003

(86) PCT No.: PCT/JP03/05157
§ 371 (c)(1),
(2), (4) Date: Aug. 24, 2004

(87) PCT Pub. No.: WO03/092097
PCT Pub. Date: Nov. 6, 2003

(65) Prior Publication Data
US 2005/0130037 A1    Jun. 16, 2005

(30) Foreign Application Priority Data
Apr. 24, 2002 (JP) ................................. 2002-122638

(51) Int. Cl.
*H01M 10/50* (2006.01)
(52) U.S. Cl. ............ 429/62; 429/61; 429/178; 429/179; 429/209; 429/211
(58) Field of Classification Search .................... 429/178
See application file for complete search history.

(56) References Cited

U.S. PATENT DOCUMENTS

| | | | | |
|---|---|---|---|---|
| 5,886,502 A | * | 3/1999 | Higashijima | 320/118 |
| 5,895,731 A | * | 4/1999 | Clingempeel | 429/162 |
| 6,002,240 A | * | 12/1999 | McMahan et al. | 429/7 |
| 6,040,086 A | * | 3/2000 | Yoshida et al. | 429/211 |
| 6,287,720 B1 | * | 9/2001 | Yamashita et al. | 429/131 |
| 6,458,485 B2 | * | 10/2002 | Yanai et al. | 429/211 |
| 6,844,105 B1 | * | 1/2005 | Hanafusa et al. | 429/62 |
| 2002/0034678 A1 | * | 3/2002 | Shibuya et al. | 429/50 |
| 2003/0194604 A1 | * | 10/2003 | Aamodt et al. | 429/128 |

FOREIGN PATENT DOCUMENTS

| | | | |
|---|---|---|---|
| JP | 07-220755 | * | 8/1995 |
| JP | 10-214613 | | 8/1998 |
| JP | 11-176483 | | 7/1999 |
| JP | 11-234916 | | 8/1999 |
| JP | 2000-90906 | | 3/2000 |
| JP | 2000-285905 | | 10/2000 |

(Continued)

*Primary Examiner* — Cynthia Lee
(74) *Attorney, Agent, or Firm* — Young & Thompson (57) ABSTRACT

A secondary battery in which temperature rise (heat generation) can be measured accurately at the time of quick charge/discharge, and a battery which can be configured readily using the secondary batteries while realizing low resistance. Separately from the positive and negative electrode terminals of a flat laminate film secondary battery, a third terminal is fixed perpendicularly thereto. The third terminal is connected with the electrode current collecting parts of a power generating element body constituting the secondary battery (1) and imparted with a potential equal to that of any one of the positive and negative electrode terminals. Inner temperature of the secondary battery is determined by measuring the temperature of the third terminal and a cell balancer circuit, or the like, is connected with the third terminal. The battery is configured by connecting the positive and negative electrode terminals directly in series.

12 Claims, 8 Drawing Sheets

FOREIGN PATENT DOCUMENTS

| | | |
|---|---|---|
| JP | 2001-178008 | 6/2001 |
| JP | 2001-325943 | 11/2001 |
| JP | 2002-8630 | 1/2002 |
| JP | 2002-8631 | 1/2002 |
| JP | 2002-117819 * | 4/2002 |
| JP | 2003-45492 | 2/2003 |
| JP | 2003-86159 | 3/2003 |

* cited by examiner

SECONDARY BATTERY HAVING THIRD TERMINAL OTHER THAN POSITIVE AND NEGATIVE ELECTRODE TERMINALS AND BATTERY COMPRISING IT

TECHNICAL FIELD OF THE INVENTION

The present invention relates to a secondary battery and a storage battery made up of the secondary batteries.

BACKGROUND OF THE INVENTION

Recently, there has been growing a demand for a battery of a large storage capacity using secondary batteries. Specifically, the demand has been growing in the applications of electric bicycles, electric bikes and electric motorcars, the attention having been focused on batteries of a 100 W to 1000 W. class and also the batteries having an output higher than 1000 W.

The conventional large storage-capacity batteries using secondary batteries have been made up of several lead cells or nickel hydrogen cells in combination, and those having large sizes, low weight and volume densities and also of high costs have been prevalent. For this reason, realizing a large storage-capacity battery having a small size and high weight and volume densities and also of a low cost has been desired.

A high-voltage lithium ion secondary battery, which serves as an elemental cell of a storage battery, has recently been realized, in which a lightweight laminate film is used as a casing. It is expected that the development of a storage battery with use of this lithium ion secondary battery will make it possible to realize a battery of a low cost and a large storage capacity having a small size and high weight and volume densities.

However, even if a storage battery of such a low cost and a large storage capacity having a small size and high weight and volume densities can be realized, many problems are still left to be solved. In particular, when the battery is used for an automobile car, rapid charge/discharge characteristics as well as a high cycle life are required, which gives rise to many problems promptly to be solved such as the lowering of an internal resistance of the battery; a heat-generation problem due to rapid charging; problems in the control of the cell balance in the interior of the battery; and the realization of a highly precise cycle-life predicting circuit.

In order to solve these problems, it is absolutely necessary to precisely measure the temperature in the interior of the cell. In the conventional secondary battery, it has been common to perform the measurement of the internal temperature by setting a temperature sensor either on a surface layer of the secondary battery or on the positive/negative electrode terminal.

Mounting a temperature sensor on a surface layer of the secondary battery, however, makes it difficult to stack a plurality of secondary batteries when building up a storage battery, because the stack arrangement of flat secondary batteries each with a casing of laminate film has temperature sensors interposed between the secondary batteries, which could result in detecting average temperatures between the stacked secondary batteries, or cause any damage to the secondary battery itself. In some cases, an arrangement has been adopted in which elastic material such as sponge sheets are sandwiched between the secondary batteries, in order to stack secondary batteries avoiding contact with the temperature sensors. The arrangement, however, entails not only lowering of the weight and volume densities but also an increase in the number of processes of constructing the storage battery as well as an increase in component costs.

Attaching a temperature sensor to an electrode terminal, on the other hand, requires an extra long terminal. Consequently, the construction of the storage battery requires a larger volume to accommodate the extra length of terminal, entailing the lowering of the volume density. Furthermore, the heat generated in the electrode terminal by the rapid charge/discharge operation causes the temperature sensor to detect the temperature of the electrode terminal rather than the temperature in the interior of the secondary battery. This has been responsible for the occurrence of the deviations in the life prediction of the secondary battery.

Furthermore, it has been common practice in connecting a cell-balancer circuit or the like to a storage battery to draw out the lead wires for the cell-balancer circuit from charge/discharge electrode terminals of cells when the cells are connected to one another, or to perform the connection between cells through a bus-bar and then draw out the lead wires for the cell-balancer circuit from the bus-bar. As a result, not only the installation of a control system such as a cell-balancer has been troublesome but also the drawing out lead wires for a cell-balancer circuit from the charge/discharge electrode terminals has prevented the electrode terminals from being shortened, entailing difficulty in lowering the internal resistance of the storage battery.

SUMMARY OF THE INVENTION

It is an object of the present invention to achieve reduction of the internal resistance of a battery as well as to improve the accuracy in the measurement of the temperature rise (or heat generation) in a secondary battery caused by a rapid charge/discharge operation of the battery. It is another object of the present invention to provide a secondary battery that allows easy construction of a storage battery and also to provide a storage battery through the use of the secondary batteries.

In order to accomplish the objects, the secondary battery of the present invention is provided with a third terminal formed to extend from either one of the positive and negative electrode collectors in an electric-power generating element included in the secondary battery, in addition to the positive and negative electrode terminals for charge and discharge. The third terminal has the same potential as the potential of the either one of positive and negative electrodes. In this way, it becomes feasible to achieve above-described objects without necessitating significantly modifying the shape of the conventional secondary battery and by adding only one step to the fabrication process of a secondary battery.

Attaching a temperature sensor to the third terminal isolates the temperature sensor from the influence of heat generation in the positive and negative electrode terminals for charge and discharge, thereby enabling accurate detection of the internal temperature of the secondary battery, i.e., the temperature of the electric-power generating element.

Furthermore, extending the third terminal in the direction perpendicular to the extension direction of the positive and negative electrode terminals facilitates the installation of the cell balancer circuit in constructing the battery. The reason for this is that, since the third terminal has the same potential as either one of the positive and negative electrodes, the third terminal can be used for the connection with a control system such as a cell balancer, while performing inter-cell connection through individual direct connections of the positive electrode terminals and the negative electrode terminals of the secondary batteries, when the storage battery is built up.

The present invention enables an accurate measurement of an internal temperature of a flat laminate-film secondary battery, thereby allowing precise prediction of a cycle life of the battery, by forming, in addition to the positive and negative electrode terminals for charge and discharge, a third terminal, which has the same electric potential as either one of the positive and negative electrode terminals, to extend from the electric-power generating element and by measuring the temperature of the third terminal, as described above. Furthermore, it becomes feasible to have the secondary batteries laminated more compact in building up a storage battery.

Since the third terminal assumes an electric potential and is also usable as a section to attach a lead wire for a cell balancer circuit as well, the wiring for control can easily be routed in building-up a storage battery, resulting in facilitating the installation of a control system such as a cell balancer and the like. As a result, it is enabled to simplify the fabricating process of a battery, further reducing a production cost.

Furthermore, since it becomes unnecessary to attach temperature sensors and lead wires for a cell balancer circuit to the positive/negative electrode terminals, the electrode terminals can be shortened to optimum lengths, and also can more easily be connected directly to each other, whereby the internal resistance of the storage battery is reduced.

PREFERRED EMBODIMENTS OF THE PRESENT INVENTION

Figure 1:
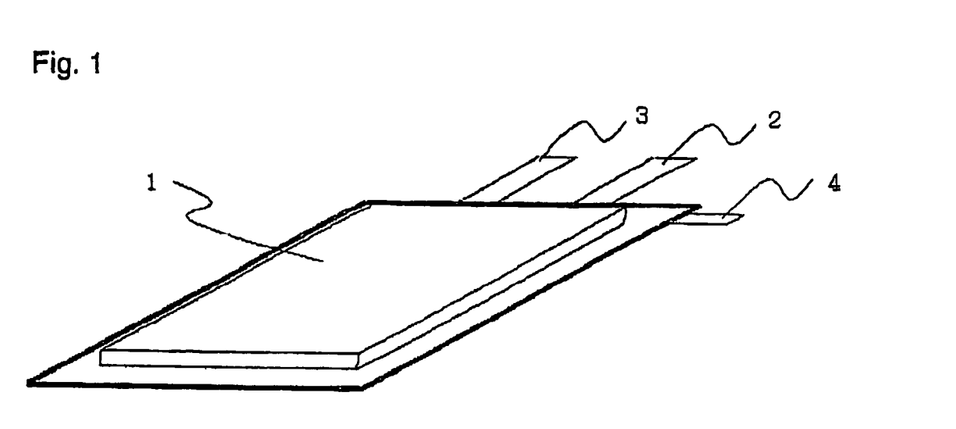
FIG. 1 is a perspective view of a flat laminate-film secondary battery according to an embodiment of the present invention.
Figure 2:
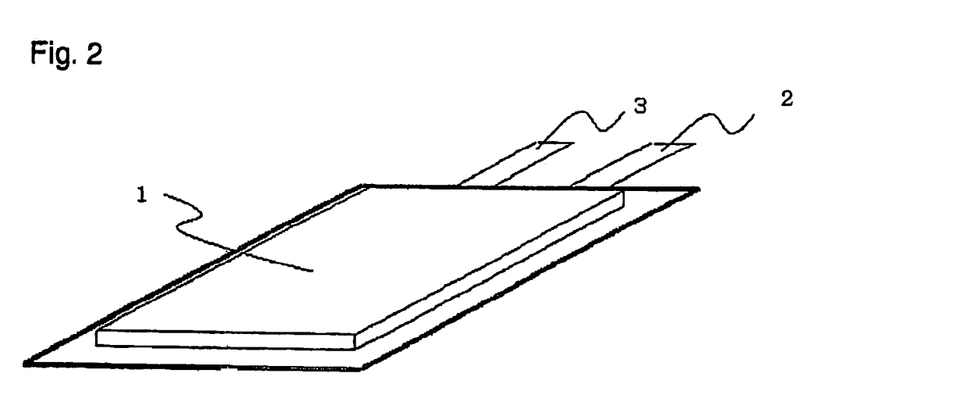
FIG. 2 is a perspective view of a conventional flat laminate-film secondary battery.

Referring to FIG. 1, flat laminate-film secondary battery of an embodiment of the present invention 1 has third terminal 4 in addition to positive electrode terminal 2 and negative electrode terminal 3. FIG. 2 illustrates a conventional flat laminate-film secondary battery.

Flat laminate-film secondary battery 1 of the present embodiment is constructed as described below.

Figure 3:
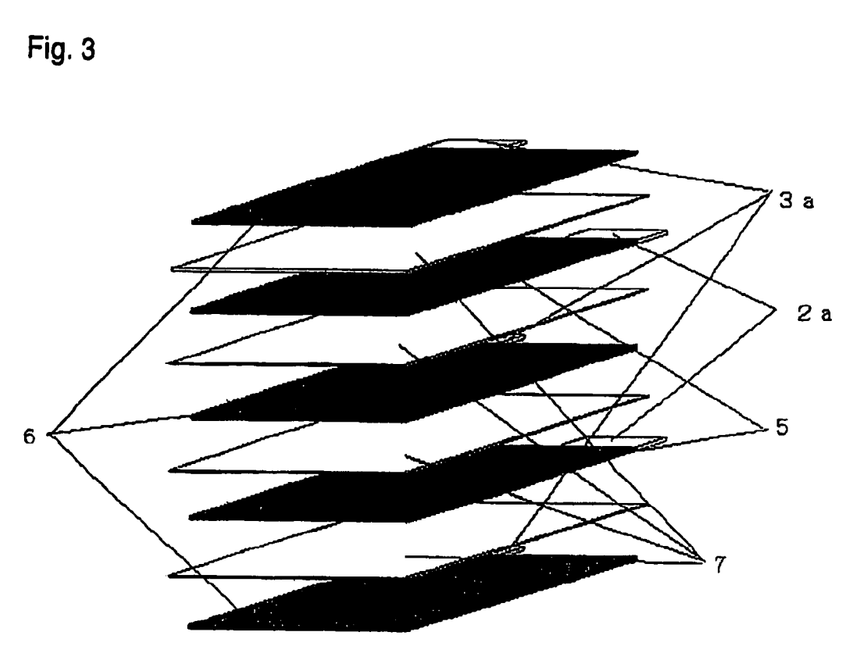
FIG. 3 is a diagram illustrating an internal structure of an electric-power generating element.

First, anode elements 5 and cathode elements 6 are alternately stacked with separators 7 interposed between them, thereby forming an electric-power generating element 8 as shown in FIG. 3.

Figure 4:
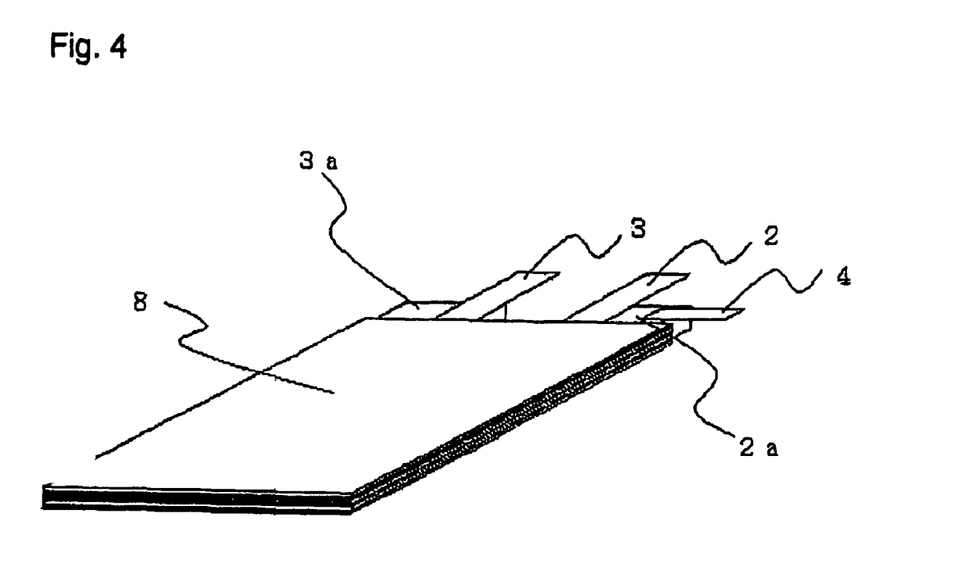
FIG. 4 is a perspective view of a flat secondary battery.

Next, positive electrode terminal 2 and negative electrode terminal 3 are attached to uncoated sections (electrode collectors) 2a and 3a, free of active material, of anode elements 5 and cathode elements 6, respectively, as shown in FIG. 4.

Next, third terminal 4 is directly connected to either one of uncoated sections 2a and 3a of anode elements 5 and cathode elements 6, respectively, of electric-power generating element 8, as shown in FIG. 4. In FIG. 4, third terminal 4 is connected to uncoated sections 2a of anode elements 5 in electric-power generating element 8, wherein third terminal 4 is attached in such a way that it does not contact positive electrode terminal 2. It is desirable to separate both of the terminals as far as possible from each other in order to minimize the influence on third terminal 4 of the heat generation possibly generated in positive electrode terminal 2 by rapid charge.

Figure 5:
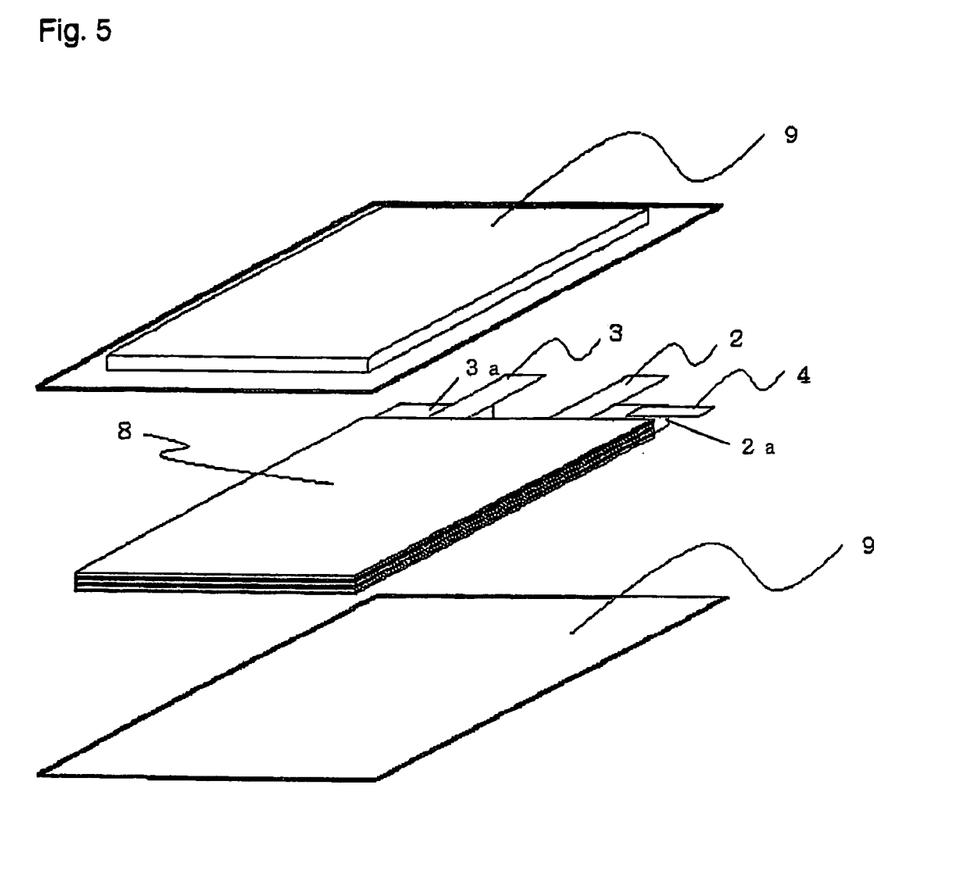
FIG. 5 is a diagram illustrating a structure of a flat laminate-film secondary battery.

Next, as shown in FIG. 5, electric-power generating element 8, in which positive and negative electrode terminals 2 and 3 and third terminal 4 are incorporated, is wrapped with laminate-film casing 9, which is sealed on the three sides by means of hot-melt fusion-bonding, and thereafter, non-aqueous electrolyte is injected into the laminate-film casing 9, which is then completely sealed under a reduced pressure, as in the conventional process of fabricating a laminate-film secondary battery.

Figure 6:
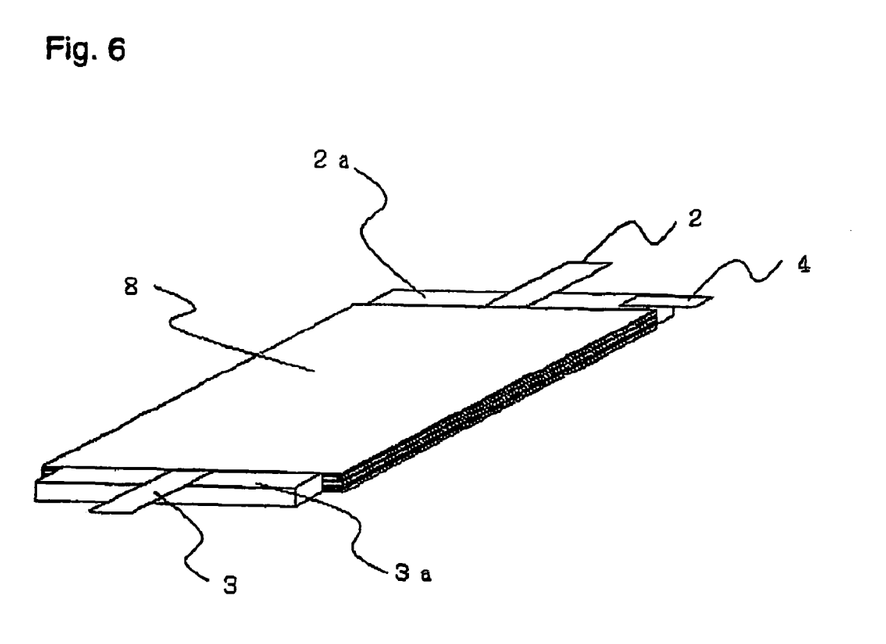
FIG. 6 is a perspective view of a flat secondary battery of an alternative embodiment.

Uncoated sections (electrode collectors) 2a, 3a, which are free of active material, of anode elements 5 and cathode elements 6, respectively, in electric-power generating element 8 may be arranged in opposed positions, as shown in FIG. 6.

Detailed explanation will next be presented regarding an example of a flat laminate-film secondary battery 1 of the present embodiment.

In a first example of the present invention, anode elements 5 and cathode elements 6 are alternately stacked with separators interposed between the anode and cathode elements and also with their electrode collectors (uncoated sections) 2a and 2b extended outwards from the same side, wherein each of the anode elements 5 comprises a sheet of aluminum foil of 20 μm in thickness to which is applied, on both faces, lithium-ion containing metal oxide natured to occlude/release a lithium ion, such as lithium-manganese composite oxide, approximately 70 μm thick; each of cathode elements 6 comprises a sheet of copper foil 15 μm thick to which is applied, on both faces, approximately 50 μm-thick hard-carbon based cathode active material that occludes/releases a lithium ion; and separator 7 is a laminate separator of a polypropylene film and a polyethylene film, which are sheets of porous insulator resin foils 25 μm thick each. A 100 μm-thick aluminum positive electrode terminal 2 and a 100 μm-thick nickel negative electrode terminal 3 are attached to electrode collectors (uncoated sections) 2a and 3a, respectively, of anode elements 5 and cathode elements 6 by means of ultrasonic welding.

An aluminum terminal of 100 μm in thickness is next attached to positive electrode collector (uncoated sections) 2a by means of ultrasonic welding so as to extend outwards from the collector 2a in the direction perpendicular to the direction of the extension of the positive/negative electrode terminal, to provide third terminal 4. While the ultrasonic welding is employed in the first example, any method capable of providing electrical conductivity, such as the resistance welding or riveting, may be employed.

Electric-power generating element 8 constructed in this way is next wrapped with an about 100 μm-thick laminate film of aluminum foil 9, into which is injected the electrolyte produced by dissolving lithium phosphate hexafluoride with non-aqueous solvent of propylene carbonate and methyl ethyl carbonate; and the laminate film is then sealed by means of hot-melt fusion-bonding under a reduced pressure.

The size of anode element 5 is 65 mm×120 mm, the size of cathode element 6 being 70 mm×125 mm, the size of separator 7 being 75 mm×130 mm, the sizes of positive and negative electrodes 2, 3 being 40 mm×10 mm, the size of the third terminal being 30 mm×5 mm, the size of laminate film 9 for the casing being 95 mm×160 mm and the width of the hot-melt fusion-bonding seal being 10 mm.

In a second example, third terminal 4 of nickel is formed extending from negative electrode collector 3a.

In a third example, anode elements 5 and cathode elements 6 are alternately stacked sandwiching separator 7 therebetween so that electrode collector 2a and electrode collectors 3a (both being the uncoated sections) will be arranged opposite each other, and third terminal 4 of aluminum is formed extending from an end of electrode collector 2a of anode elements, perpendicularly to the direction in which positive and negative electrodes extend and further in the position sufficiently remote from positive electrode terminal 2, as shown in FIG. 6.

In a fourth example, third terminal 4 of nickel is formed extending from an end of electrode collector (uncoated sections) 3a of cathode elements of electric-power generating element 8 perpendicularly to the direction in which positive and negative electrodes extend and further in the position sufficiently remote from negative electrode terminal 3, wherein electric-power generating element 8 of the fourth example is the same as that of the third example.

The constituent elements and the dimension of the constituent elements employed in the second to fourth examples are identical to those employed in the first example. These examples differ from one another only in that the directions in which the positive and negative electrodes extend differ and that the potential applied to third terminal 4 differs. The flat laminate-film secondary batteries 1 disclosed in the first to fourth examples have 4.2 V (2 Ah) characteristics. The thickness is 4 mm, and the weight is 80 g.

Table 1 represents the result of the measurements of the temperature in the interior of a flat laminate-film secondary battery 1 disclosed in each of the first to fourth examples. The measurements were carried out as follows. The forced discharge of 50 A for 5 sec. was performed at an ambient temperature of 20° C., and then maximum attained temperatures were measured by means of thermocouples at positive and negative electrode terminals 2, 3, third terminal 4 and three places on the surface of the flat laminate-film secondary battery. Temperature rises (differences) with respect to the surface temperatures were determined at each site. Table 1 represents the temperature rises.

It is presumed that the surface of the flat laminate-film secondary battery 1 is in the thermal equilibrium with the interior of the battery, the surface temperature representing an approximate internal temperature. In the prior art, it has been common practice to regard the temperature of positive/negative electrode 2, 3 as an internal temperature of the flat laminate-film secondary battery.

TABLE 1

|  | 1st example | 2nd example | 3rd example | 4th example |
| --- | --- | --- | --- | --- |
| Temperature difference (° C.) of positive electrode terminal | 30.5 | 29.5 | 30.0 | 30.5 |
| Temperature difference (° C.) of negative electrode terminal | 49.5 | 48.5 | 49.5 | 48.5 |
| Temperature difference (° C.) of third terminal (on the positive electrode collector) | 3.5 | — | 0 | — |
| Temperature difference (° C.) of third terminal (on the negative electrode collector) | — | 9.0 | — | 1.0 |

As is seen from Table 1, the temperature differences of the positive and negative electrode terminals (the differences from the surface temperature of the cell) in the first and second examples are significantly large, approximately 30° C. at the positive electrode terminal and a little under 50° C. at the negative electrode terminal. The temperature differences in the third terminal, in contrast, are 3.5° C. on the positive electrode collector and 9.0° C. on the negative electrode collector, indicating that the temperature in the third terminal approximates the internal temperature of the cell with much higher accuracy than the method of measurement according to prior art. In the third and fourth examples as well, the temperature differences of the positive and negative terminals (the differences from the surface temperature of the cell) are large, indicating approximately 30° C. at the positive electrode terminal and a little under 50° C. at the negative electrode terminal.

The temperature differences of the third terminal, in contrast, are 0° C. on the positive electrode collector and 1.0° C. on the negative electrode collector, indicating that the third terminal exhibits the temperature nearer the internal temperature of the cell than the temperatures of the third terminals in the first and second examples. The reason for this is considered that the third terminals of the third and fourth examples are attached to the positions sufficiently remote from the positive and negative electrode terminals in order to be more insusceptible to the effect of heat generation in the positive and negative electrode terminals than the cases of the first and second examples.

The flat laminate-film secondary battery 1 provided with the third terminal of the present embodiment allows measurement of the internal temperature of a cell with a markedly higher accuracy than the conventional one, in any of the first to fourth examples. In addition, since the temperature difference of the third terminal tends to exhibit a lower value on the positive electrode collector than on the negative electrode collector, it is realized that the third terminal of the third example provides the nearest temperature value to the internal temperature of a cell.

Figure 7:
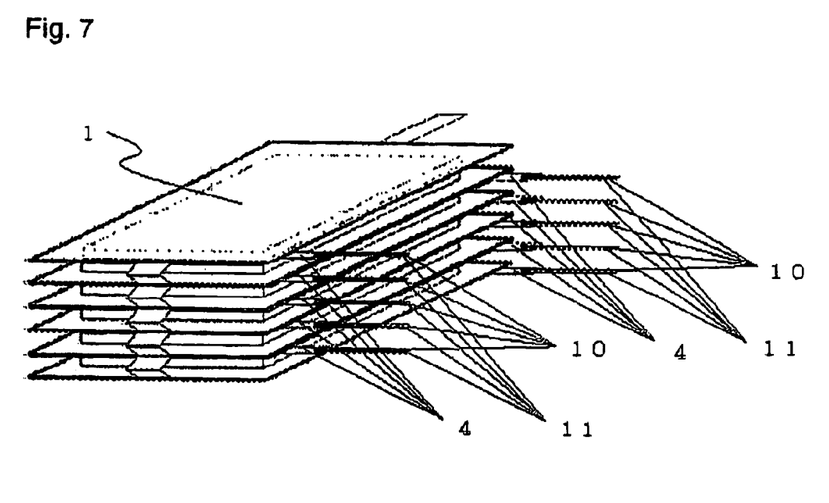
FIG. 7 is a diagram illustrating a structure of a storage battery using flat laminate-film secondary batteries according to an embodiment of the present invention.

FIG. 7 illustrates an embodiment of the storage battery according to the present invention, which uses flat laminate-film secondary batteries 1 of the present embodiment. The storage battery is structured such that ten flat laminate-film secondary batteries 1 are stacked with the positive and negative electrode terminals for charge/discharge being serially connected directly and further third terminals 4 being directed in the same direction. This structure is built up by stacking flat laminate-film secondary batteries 1 of the fourth example with the positive electrode terminals and the negative electrode terminals individually connected directly to make serial connections after connecting temperature-detecting sensors 10 and lead wires 11 for a cell balancer circuit to third terminals 4 of the flat laminate-film secondary batteries 1. The flat laminate-film secondary batteries 1 are stacked to realize the highest volumetric efficiency without providing any temperature-detecting sensor, an elastic element such as a sponge sheet, or the like between successive secondary batteries.

Figure 8:
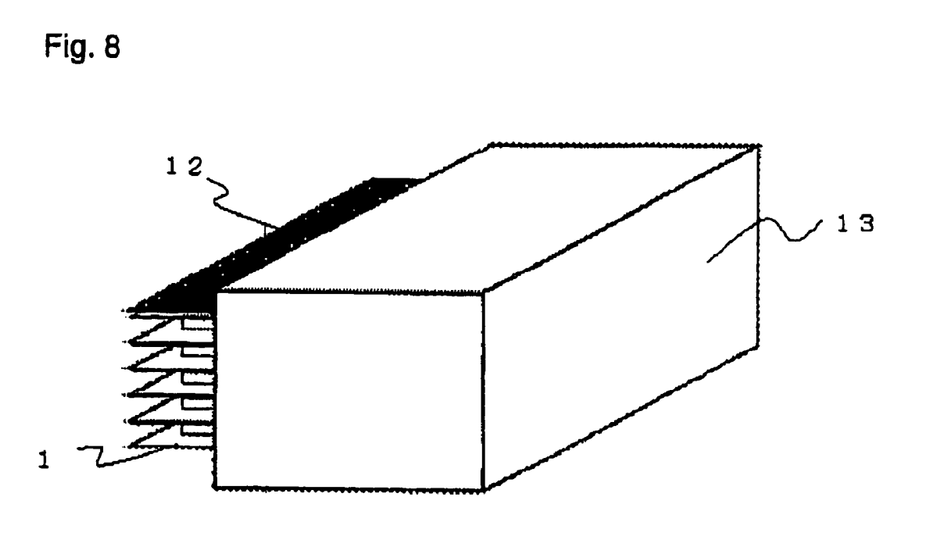
FIG. 8 is a diagram illustrating an example of building up a storage battery using flat laminate-film secondary batteries.

FIG. 8 illustrates a storage battery constructed by connecting temperature-detecting sensor 10 and the lead wires 11 for a cell balancer, which extend from the third terminals of flat laminate-film secondary batteries 1 built up as described above, to control circuit 12 and wrapping the built-up flat laminate-film secondary batteries 1 with aluminum casing 13 of 2 mm in thickness.

Figure 9:
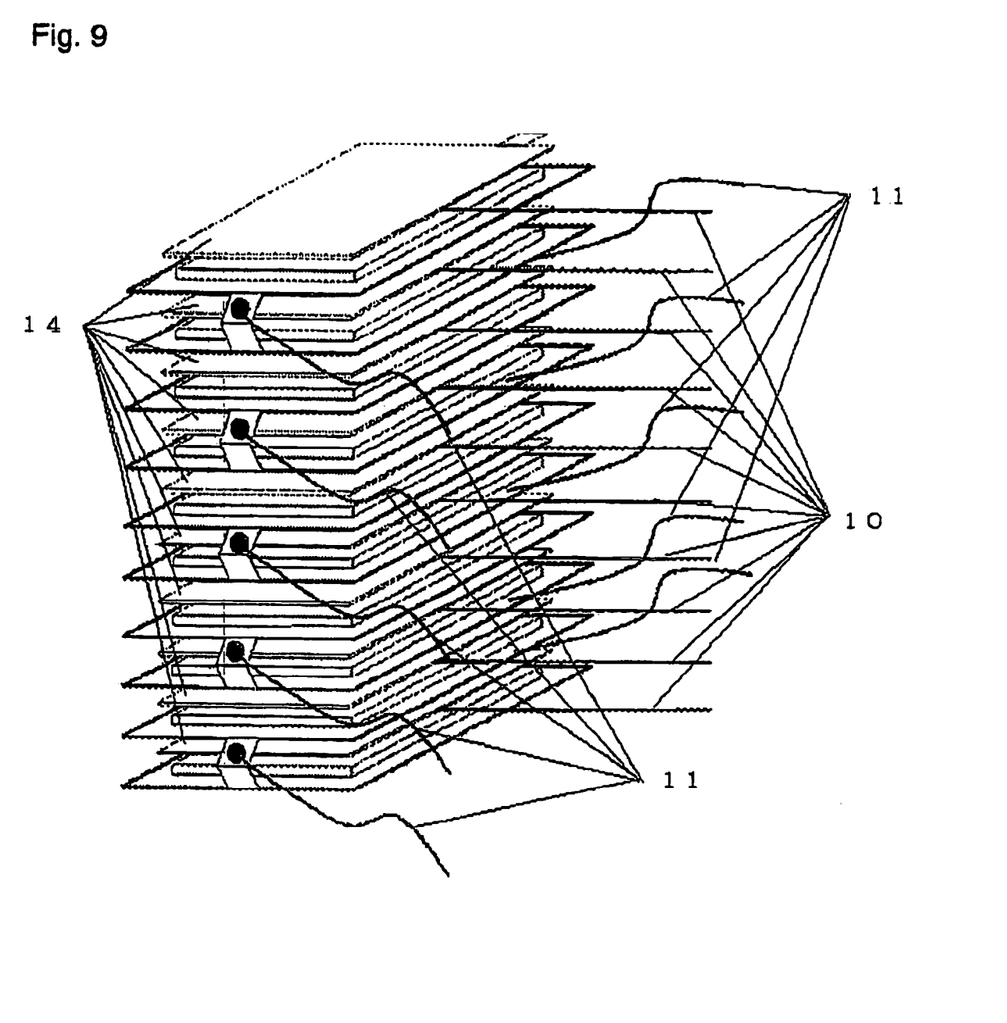
FIG. 9 is a diagram illustrating a structure of a storage battery using conventional flat laminate-film secondary batteries.

Referring to FIG. 9, there is illustrated a conventional storage battery for comparison. The storage battery was built up through the use of secondary batteries each of which had basically the same structure as the flat laminate-film secondary battery of the fourth example except that it was lacking the third terminal. The conventional storage battery was built up through the processes of attaching temperature-detecting sensor 10 to the central region of the surface of each secondary battery; connecting each lead wire 11 for a cell balancer circuit to the positive-electrode-terminal side of the positive and negative electrode terminals for charge and discharge; directly connecting the positive electrode terminals and the negative electrode terminals individually to form serial connections; and stacking the secondary batteries sandwiching elastic sponge boards (15 g in weight, 2 mm×70 mm×120 mm in size) between successive secondary batteries. After stacking the secondary batteries in this way, each of temperature-detecting sensors 10 and each of lead wires 11 for a cell balancer circuit were connected to control circuit 12, and the whole battery system was wrapped with aluminum casing 13 of 2 mm in thickness like the example shown in FIG. 8. A conventional storage battery was produced in this way.

As a result, the storage battery of the present embodiment exhibits 35% reduction in a volume ratio and 10% reduction in a weight ratio, enabling an improvement in the weight and volume densities of the storage battery.

In the present embodiment, the third terminals are formed extending from the sides of the rectangular flat laminate-film secondary batteries 1, on which none of the positive and negative electrodes for charge and discharge are attached, in the direction perpendicular to the direction in which the positive and negative electrodes extend. The angle included between the extending directions of the third terminals and the positive and negative electrodes for charge and discharge need not necessarily be perpendicular, provided that it is feasible to install the cell balancer circuit and the like to be connected to the third terminals in a compact manner without necessitating a superfluous space.

Furthermore, the flat laminate-film secondary battery can have a shape other than a rectangle, provided that the shape allows the cell balancer circuit and the like to be connected in a compact manner without necessitating a superfluous space.

What is claimed is:

1. A flat secondary battery comprising:
   an electric-power generating element provided with positive and negative electrode collectors, each of said collectors having a respective uncoated area that is free of active material;
   positive and negative electrode terminals for charge and discharge and that are attached to said uncoated areas of said positive and negative electrode collectors, respectively; and
   a third terminal that is attached directly to said uncoated area of one of said positive and negative electrode collectors and that does not directly contact either of said positive and negative electrode terminals,
   wherein said third terminal and a respective one of said positive and negative electrode terminals are attached to said uncoated area of said one of said positive and negative electrode collectors at different positions in order to avoid an influence on said third terminal of heat from the respective one of said positive and negative electrode terminals,
   wherein said third terminal has a same electric potential as said respective one of said positive and negative electrode terminals and said third terminal is attached electrically conductively to said uncoated area of said one of said positive and negative electrode collectors, and
   wherein a temperature of said flat secondary battery can be measured by said third terminal.

2. A flat secondary battery according to claim 1, wherein said third terminal is formed to extend in the direction differing from the extending direction of said positive and negative electrode terminals for charge and discharge.

3. A flat secondary battery according to claim 2, wherein the direction in which said third terminal extends is perpendicular to said extending direction of said positive and negative electrode terminals for charge and discharge.

4. A flat secondary battery according to claim 1, wherein electric-power generating element is made up of anode elements and cathode elements alternately stacked with a separator sandwiched between each anode element and each cathode element.

5. A flat secondary battery according to claim 1, provided with a casing of a laminate film.

6. A storage battery of a serial type using a plurality of flat secondary batteries according to claim 1.

7. A flat secondary battery according to claim 2, wherein said electric-power generating element is made up of anode elements and cathode elements alternately stacked with a separator sandwiched between each anode element and each cathode element.

8. A flat secondary battery according to claim 3, wherein said electric-power generating element is made up of anode elements and cathode elements alternately stacked with a separator sandwiched between each anode element and each cathode element.

9. A flat secondary battery according to claim 1, wherein said third terminal is attached directly to said uncoated area of said one of said positive and negative electrode collectors at a position that is opposite and remote from a position where the respective one of said positive and negative electrode terminals for charge and discharge is attached to said uncoated area of said one of said positive and negative electrode collectors.

10. A flat secondary battery according to claim 5, wherein said third terminal is attached to said one of said positive and negative electrode collectors inside said casing.

11. A flat secondary battery according to claim 1, further comprising an outer member that forms a body of the battery and wherein said third terminal is attached to said one of said positive and negative electrode collectors inside said outer member.

12. A flat secondary battery according to claim 1, comprising two of said third terminal that are each attached to a respective one of said positive and negative electrode collectors.

* * * * *